United States Patent
Chen

(10) Patent No.: US 8,736,448 B2
(45) Date of Patent: May 27, 2014

(54) NOTEBOOK COMPUTER STAND

(75) Inventor: Xue-Yun Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 123 days.

(21) Appl. No.: 13/397,712

(22) Filed: Feb. 16, 2012

(65) Prior Publication Data

US 2013/0169439 A1 Jul. 4, 2013

(30) Foreign Application Priority Data

Dec. 30, 2011 (CN) .......................... 2011 1 0452574

(51) Int. Cl.
- *G08B 13/14* (2006.01)
- *G08B 13/12* (2006.01)
- *H01H 1/58* (2006.01)
- *H01R 33/96* (2006.01)
- *H01H 1/64* (2006.01)
- *H01H 13/00* (2006.01)
- *H01H 3/12* (2006.01)

(52) U.S. Cl.
USPC .................. 340/568.1; 340/568.2; 340/568.8; 340/571; 340/572.3; 340/572.8; 340/572.9; 200/51 R; 200/51.09; 200/293; 200/294; 200/341

(58) Field of Classification Search
None
See application file for complete search history.

(56) References Cited

U.S. PATENT DOCUMENTS

| | | | | |
|---|---|---|---|---|
| 4,985,695 A | * | 1/1991 | Wilkinson et al. | 340/568.3 |
| 5,936,526 A | * | 8/1999 | Klein | 340/571 |
| 7,523,803 B2 | * | 4/2009 | Breed | 180/273 |
| 2007/0236348 A1 | * | 10/2007 | Peng et al. | 340/568.1 |
| 2007/0258206 A1 | * | 11/2007 | Huang | 361/687 |
| 2008/0157942 A1 | * | 7/2008 | Payne | 340/426.12 |
| 2010/0188220 A1 | * | 7/2010 | Boyd | 340/568.1 |

* cited by examiner

*Primary Examiner* — George Bugg
*Assistant Examiner* — Renee Dorsey
(74) *Attorney, Agent, or Firm* — Novak Druce Connolly Bove + Quigg LLP

(57) ABSTRACT

A notebook computer stand includes a base and an anti-theft circuit received in the base. A number of supporting pads are positioned on the top surface of the base, to support a notebook computer. The anti-theft circuit includes a pressure sensitive switch, an alarm, a control switch, and a battery. The pressure sensitive switch, the alarm, and the control switch are connected in series. The pressure sensitive switch is positioned on one of the supporting pads. When the notebook computer is placed on the top surface, the pressure sensitive switch is open. The pressure sensitive switch is closed when not under the pressure applied by the weight of the notebook computer, and the battery supplies power to the alarm, the alarm works, when the control switch is closed.

5 Claims, 3 Drawing Sheets

NOTEBOOK COMPUTER STAND

BACKGROUND

1. Technical Field

The present disclosure relates to a notebook computer stand.

2. Description of Related Art

Portability is an important consideration in the decision making process when one is considering buying notebook computers, however, this property of portability also contributes to the notebook computers to be easily stolen.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRFIPTION

The disclosure, including the drawings, is illustrated by way of example and not by way of limitation. References to "an" or "one" embodiment in this disclosure are not necessarily to the same embodiment, and such references mean at least one.

Figure 1:
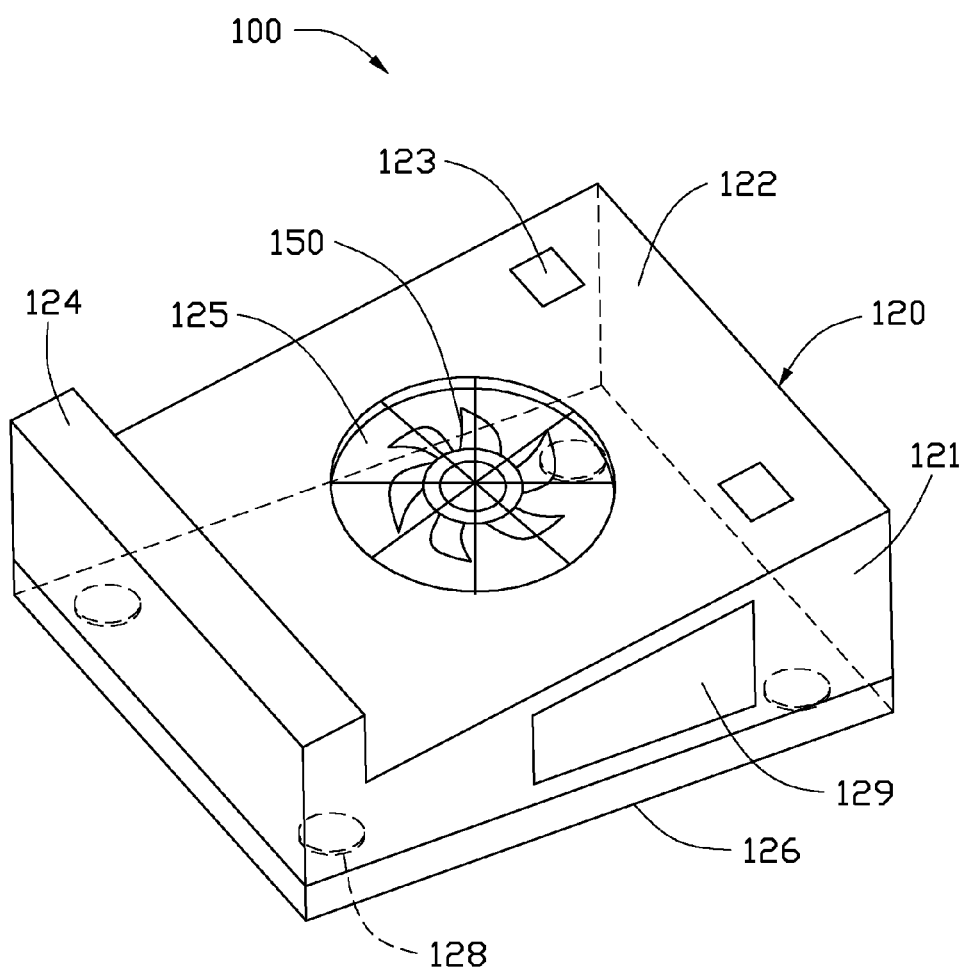
FIG. 1 is an isometric view of a notebook computer stand in accordance with an exemplary embodiment of the present disclosure, wherein the notebook computer stand includes an anti-theft circuit.
Figure 2:
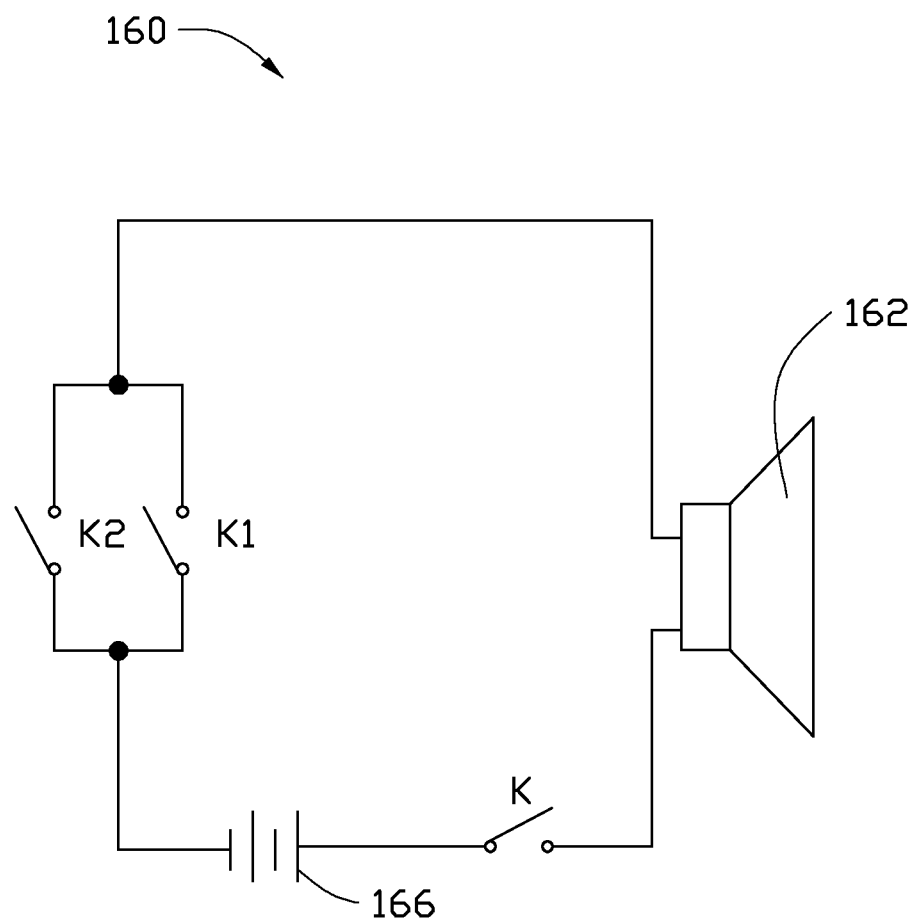
FIG. 2 is a circuit diagram of the anti-theft circuit of FIG. 1.
Figure 3:
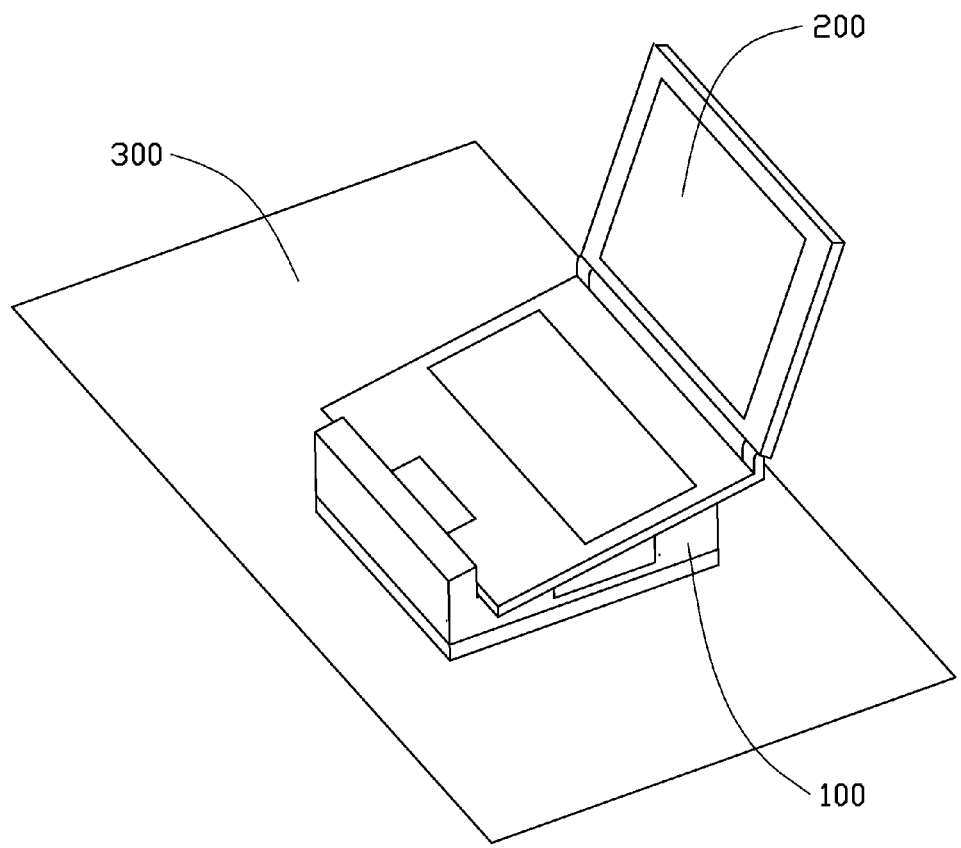
FIG. 3 is an isometric view of the notebook computer stand of FIG. 1 supporting a notebook computer.

FIGS. 1-3, are exemplary embodiments of a notebook computer stand 100 including a main body 120, a cooling assembly 150, and an anti-theft circuit 160. The cooling assembly 150 and the anti-theft circuit 160 are received in the main body 120. The main body 120 is used to support a notebook computer 200. The cooling assembly 150 is used to dissipate heat for the notebook computer 200. The anti-theft circuit 160 is used to prevent the notebook computer 200 from being stolen.

The main body 120 includes a base 121, and an abutting portion 124 extending up from a first end of the base 121. The base 121 includes a horizontal bottom surface 126, an inclined top surface 122 opposite to and acutely angled with the bottom surface 126. The first end of the base 121 is thinner than a second end of the base 121 opposite to the first end. A plurality of first supporting pads 123 is positioned on the top surface 122. A ventilation hole 125 is defined in the top surface 122, aligned with the cooling assembly 150. The ventilation hole 125 is covered with a protective net. A plurality of second supporting pads 128 is positioned on the bottom surface 126. A cavity 129 is defined in the base 121, between the top surface 122 and the bottom surface 126. The cooling assembly 150 and the anti-theft circuit 160 are received in the cavity 129. In one embodiment, the cooling assembly 150 is a fan with a universal serial bus interface.

The anti-theft circuit 160 includes a control switch K, an alarm 162, a battery 166, and two pressure sensitive switches K1 and K2. The pressure sensitive switches K1 and K2 are connected in parallel. One end of each of the pressure sensitive switches K1 and K2 is connected to a positive terminal of the battery 166 via the alarm 162 and the control switch K connected in series. The other end of each of the pressure sensitive switches K1 and K2 is connected to a negative terminal of the battery 166. In one embodiment, the pressure sensitive switch K1 is positioned on one of the first support pads 123, and the pressure sensitive switch K2 is positioned on one of the second support pads 128. Each of the pressure sensitive switches K1 and K2 is in an open state when under pressure, and is in a closed state in the absence of pressure. The control switch K is received in the cavity 129, and positioned on a proper place to facilitate a hand of a user to operate the control switch K.

In use, the notebook computer stand 100 is placed on a supporting plane 300. The notebook computer 200 is placed on the top surface 122. The first supporting pads 123 support the notebook computer 200. The abutting portion 124 abuts against a front side of the notebook computer 200, to prevent the notebook computer 200 from sliding down from the top surface 122. The second support pads 128 support the notebook computer stand 100. To prevent the notebook computer 200 from being stolen, the control switch K is closed to turn on the anti-theft circuit 160. At this moment, the pressure sensitive switch K1 is sandwiched between the first support pad 123 and the notebook computer 200, and is open because of the pressure applied by the weight of the notebook computer 200. The pressure sensitive switch K2 is sandwiched between the second support pad 128 and the supporting plane 300, and is open because of the pressure applied by the weight of the notebook computer stand 100 and the notebook computer 200. The battery 166 cannot supply power to the alarm 162. The alarm 162 does not work.

When the notebook computer 200 is removed from the notebook computer stand 100, the pressure sensitive switch K1 is closed because the pressure sensitive switch K1 is not under the pressure applied by the weight of the notebook computer 200. The battery 166 supplies power to the alarm 162, and the alarm 162 works to alert the user. When the notebook computer stand 100 and the notebook computer 200 together are lifted up or remove from the supporting plane 300, the pressure sensitive switch K2 is closed because the pressure sensitive switch K2 is no longer under the pressure applied by the weight of the notebook computer stand 100 and the notebook computer 200. The battery 166 supplies power to the alarm 162, and the alarm 162 works. In one embodiment, the alarm 162 is a buzzer.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A notebook computer stand, comprising:
    a base comprising a top surface, the top surface comprising a plurality of first supporting pads to support a notebook computer; and
    an anti-theft circuit received in the base, the anti-theft circuit comprising a first pressure sensitive switch, an alarm, a control switch, and a battery;
    wherein the first pressure sensitive switch, the alarm, and the control switch are connected in series, and the first pressure sensitive switch is positioned on one of the first supporting pads;

wherein when the notebook computer is placed on the top surface, the first supporting pads support the notebook computer, the first pressure sensitive switch is sandwiched between the one of the first supporting pads and the notebook computer, the first pressure sensitive switch is in an open state;

wherein when the first pressure sensitive switch is not under the pressure applied by the weight of the notebook computer, the first pressure sensitive switch is closed, the battery supplies power to the alarm, and the alarm works, in response to the control switch being closed; and wherein the base further comprises a bottom surface, the bottom surface comprises a plurality of second supporting pads to support the notebook computer stand, the anti-theft circuit further comprises a second pressure sensitive switch connected in parallel with the first pressure sensitive switch, the second pressure sensitive switch is positioned on one of the second supporting pads, when the notebook computer is placed on the top surface, and the notebook computer stand is placed on a supporting plane, the second pressure sensitive switch is sandwiched between the one of the second supporting pads and the supporting plane, the second pressure sensitive switch is in an open state, when the second pressure sensitive switch is not under the pressure applied by the weight of the notebook computer stand and the notebook computer, the second pressure sensitive switch is closed, the battery supplies power to the alarm, and the alarm works, in response to the control switch being closed.

2. The notebook computer stand of claim 1, further comprising a cooling assembly received in the base, wherein a ventilation hole is defined in the top surface, aligned with the cooling assembly, the ventilation hole is covered with a protective net.

3. The notebook computer stand of claim 2, wherein the cooling assembly is a fan.

4. The notebook computer stand of claim 1, wherein the control switch is received in the base.

5. The notebook computer stand of claim 1, wherein the alarm is a buzzer.

* * * * *